(12) United States Patent
Yamamoto et al.

(10) Patent No.: US 10,963,108 B2
(45) Date of Patent: Mar. 30, 2021

(54) METHOD IMPLEMENTED IN SYSTEM FOR DERIVING POSITION OF PEN ON SENSOR PANEL, PEN, AND SENSOR CONTROLLER

(71) Applicant: Wacom Co., Ltd., Saitama (JP)

(72) Inventors: Sadao Yamamoto, Saitama (JP); Haruhiko Hisano, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/751,134

(22) Filed: Jan. 23, 2020

(65) Prior Publication Data

US 2020/0257407 A1    Aug. 13, 2020

(30) Foreign Application Priority Data

Feb. 13, 2019    (JP) .............................. JP2019-023183

(51) Int. Cl.
*G09G 1/00*    (2006.01)
*G06F 3/044*    (2006.01)

(52) U.S. Cl.
CPC ................................. *G06F 3/0442* (2019.05)

(58) Field of Classification Search
None
See application file for complete search history.

(56) References Cited

U.S. PATENT DOCUMENTS

| | | | |
|---|---|---|---|
| 2012/0242603 A1* | 9/2012 | Engelhardt | G06F 21/36 345/173 |
| 2015/0277587 A1* | 10/2015 | Chandran | G06F 21/445 345/173 |
| 2016/0246390 A1* | 8/2016 | Lukanc | G06F 3/038 |
| 2018/0113523 A1 | 4/2018 | Hara et al. | |

FOREIGN PATENT DOCUMENTS

WO    2018/020598 A1    2/2018

* cited by examiner

*Primary Examiner* — Michael A Faragalla
(74) *Attorney, Agent, or Firm* — Seed IP Law Group LLP

(57) ABSTRACT

A method implemented in a system for deriving a position of a pen on a sensor panel by transmitting and receiving signals via capacitive coupling between a pen tip electrode of the pen and the sensor panel, includes: transmitting a first signal indicating a reference time of one frame period via the sensor panel, from a sensor controller that performs a pen detecting operation only at one or more specific time periods in the one frame period; and transmitting a burst signal that does not include a data signal indicating an operating state of the pen, from the pen that has detected the first signal, at each of the one or more specific time periods in the frame period indicated by the first signal.

6 Claims, 4 Drawing Sheets

METHOD IMPLEMENTED IN SYSTEM FOR DERIVING POSITION OF PEN ON SENSOR PANEL, PEN, AND SENSOR CONTROLLER

BACKGROUND

Technical Field

The present disclosure relates to a method implemented in a system for deriving a position of a pen on a sensor panel, the pen, and a sensor controller.

Background Art

A downlink signal that a pen transmits to a sensor controller includes a burst signal and a data signal. The burst signal is a signal configured by repeating a predetermined waveform (a waveform used by the sensor controller for pen detection; for example, a sine waveform having a predetermined frequency), and is used for pen detection by the sensor controller. The data signal is a signal modulated by various data (writing pressure value, pen identifier (ID), etc.) held inside the pen, and is used to supply these pieces of data from the pen to the sensor controller.

International Patent Application Publication No. WO 2018/020598A (hereinafter, referred to as Patent Document 1) discloses an example of a pen having a function of transmitting a long burst signal instead of the burst signal. The long burst signal is a signal transmitted in response to an instruction from the sensor controller, and is continuously transmitted for a predetermined period from the time of reception of the instruction. The content of the long burst signal is constituted by repetition of a predetermined waveform as in the burst signal. When this long burst signal is used, the possibility of burst signal detection failure by the sensor controller can be reduced while ensuring a state in which the burst signal can be detected in a wide range in the touch surface, as described in Patent Document 1.

However, depending on the configuration of the sensor controller, transmitting a long burst signal continuously over a predetermined time may not be preferable. Details will be described below.

The first example is the case where the sensor controller is configured to receive a downlink signal intermittently instead of receiving continuously after giving instruction to transmit a long burst signal. As a specific example, for example, when a sensor controller uses an electrode for both reception of a downlink signal and a display operation of a display (for example, a common electrode of a liquid crystal display, a negative electrode of an organic electronic luminescent (EL) display, etc.), the sensor controller is configured to receive the downlink signal only during idle times of display operations of the display (e.g., horizontal regression time and vertical regression time). The sensor controller corresponding to the touch detection in addition to the pen detection is configured to receive the downlink signal only during the pen detection period out of the periods set in time division for the pen detection and touch detection.

The downlink signal is only noise for the display operation or touch detecting operation of the display. Therefore, it is desirable to stop the transmission of the long burst signal while the display operation or the touch detecting operation of the display is being performed, but conventionally, such stop has not been performed, and the downlink signal has become noise.

The next one is the case where the sensor controller uses a time slot. In a type of the sensor controller configured to set a frame of a predetermined time length including a plurality of time slots and to receive a downlink signal only within each time slot, the phase of the long burst signal is preferably approximately zero at the start timing of each time slot.

However, an operation of only transmitting the long burst signal continuously over a predetermined time causes a possibility that the phase of the long burst signal may become far away from zero at the start timing of each time slot, and thus since detection of the burst signal by the sensor controller becomes difficult, improvement has been required.

BRIEF SUMMARY

Accordingly, one of the objects of the present disclosure is to provide a method, pen, and sensor controller that prevent the long burst signal from becoming noise and to enable the sensor controller to easily detect the long burst signal while enjoying the benefits of the long burst signal.

The method according to the present disclosure is a method implemented in a system for deriving a position of a pen on a sensor panel by transmitting and receiving signals via capacitive coupling between a pen tip electrode of the pen and the sensor panel and includes: transmitting a first signal indicating a reference time of one frame period via the sensor panel, from a sensor controller that performs a pen detecting operation only at one or more specific time periods in the one frame period; and transmitting a burst signal that does not include a data signal indicating an operation state of the pen, from the pen that has detected the first signal, at each of the one or more specific time periods in the frame period indicated by the first signal.

The pen according to the present disclosure is a pen that transmits and receives signals to and from a sensor controller that performs a pen detecting operation only at one or more specific time periods in one frame period, through capacitive coupling between a pen tip electrode and a sensor panel, and includes: a processor; and a memory storing instructions that, when executed by the processor, cause the pen to: receive a first signal indicating a reference time of the one frame period from the sensor controller; and transmit a burst signal that does not include a data signal indicating an operating state of the pen at each of the one or more specific time periods in the frame period indicated by the first signal.

The sensor controller according to the present disclosure is a sensor controller for deriving a position of a pen on a sensor panel by transmitting and receiving signals via capacitive coupling between a pen tip electrode of the pen and the sensor panel, and includes: a processor; and a memory storing instructions that, when executed by the processor, cause the sensor controller to: perform a pen detecting operation only at one or more specific time periods in one frame period; transmit a first signal indicating a reference time of the one frame period via the sensor panel; and derive the position of the pen based on a burst signal that does not include a data signal indicating an operating state of the pen and that is transmitted from the pen that has detected the first signal, at each of the one or more specific time periods in the frame period indicated by the first signal.

According to the present disclosure, while transmission of the burst signal is carried on over one frame, the burst signal is transmitted only during the time periods when the pen detecting operation by the sensor controller is performed, and therefore, the long burst signal can be prevented from becoming noise while the benefits of the long burst signal are enjoyed. In addition, since the timing at which the pen detecting operation by the sensor controller is started (start timing of a specific time period) can be made to agree with the transmission start timing of the burst signal, the sensor controller can easily detect the long burst signal.

DETAILED DESCRIPTION

Hereinafter, an embodiment of the present disclosure will be described in detail with reference to the accompanying drawings.

Figure 1:
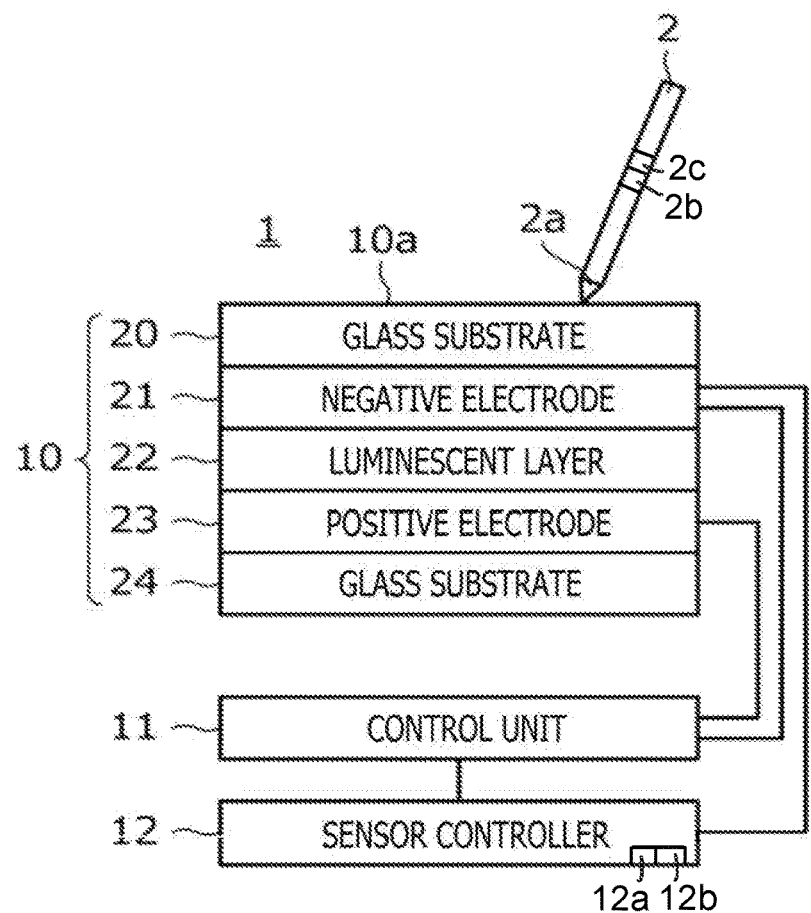
FIG. 1 is a diagram illustrating a system including an electronic device and a pen according to an embodiment of the present disclosure.

FIG. 1 is a diagram illustrating a system including an electronic device 1 and a pen 2 according to the present embodiment. The electronic device 1 is, for example, a tablet computer and includes a display device 10, control unit 11, and sensor controller 12, as illustrated in FIG. 1. The pen 2 is, for example, an electronic pen (active pen) conforming to the active capacitive method. A pen tip of the pen 2 is provided with a pen tip electrode 2a, a processor 2b, and a memory 2c storing instructions that, when executed by the processor 2b, cause the pen 2 to perform the acts of the pen 2 described herein.

As the display device 10, various displays such as a liquid crystal display, an organic EL display, and electronic paper can be used, and FIG. 1 illustrates an example in which an organic EL display is used. As illustrated in FIG. 1, the display device 10 in this case has a stacked structure in which a negative electrode 21, luminescent layer 22, and positive electrode 23 are stacked in this order between a glass substrate 20 whose one surface constitutes a touch surface 10a and another glass substrate 24. Among these, the luminescent layer 22 and the positive electrode 23 are provided separately for each pixel. The control unit 11 causes the display device 10 to display an image of image data by controlling the voltage applied to each positive electrode 23 based on the image data of display target while supplying the ground potential to the negative electrode 21.

The negative electrode 21 also functions as a sensor panel that exchanges signals with the pen 2 through capacitive coupling with the pen tip electrode 2a. That is, the electronic device 1 is an "in-cell method" position detecting device that uses an electrode for both display and position detection.

Figure 2:
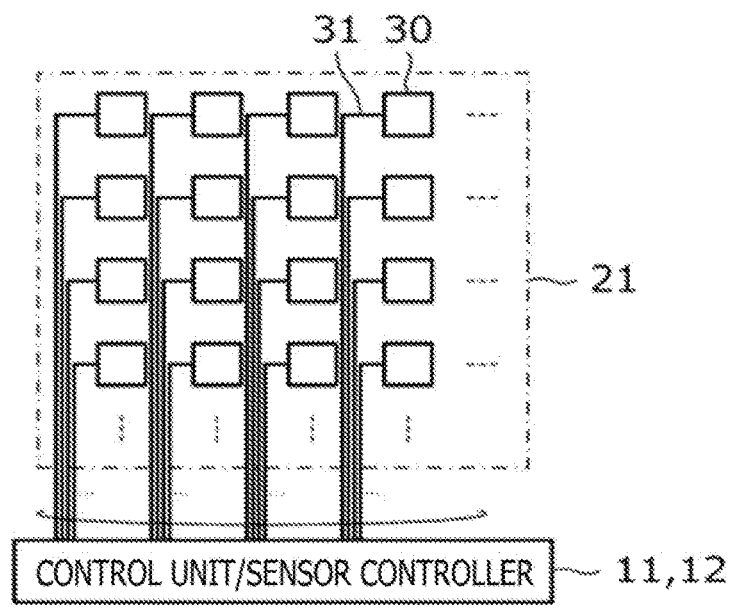
FIG. 2 is a diagram schematically illustrating a planar structure of a negative electrode illustrated in FIG. 1.

FIG. 2 is a diagram schematically illustrating a planar structure of the negative electrode 21. As illustrated in FIG. 2, the negative electrode 21 includes a plurality of electrodes 30 arranged in a matrix. In addition, the electrodes 30 are arranged far apart from each other in FIG. 2, but are actually arranged more closely. Each electrode 30 is connected to each of the control unit 11 and the sensor controller 12 by a lead wire 31.

When the display device 10 is caused to display an image of image data, the same ground potential is supplied from the control unit 11 to all of the plurality of electrodes 30. On the other hand, when a signal (uplink signal US to be described later) is transmitted to the pen 2, a signal having the same content is supplied from the sensor controller 12 to each electrode 30. Thereby, the uplink signal US is transmitted from the entire touch surface 10a. When receiving a signal transmitted by the pen 2 (downlink signal DS to be described later), the sensor controller 12 scans each electrode 30 one by one. Due to this, the sensor controller 12 can receive the downlink signal DS for each electrode 30.

The control unit 11 is a computer having a processor and a memory (neither is illustrated), and the processor reads and executes a program stored in the memory, so that the control unit 11 performs various processes such as control of each section of the electronic device 1 including the illustrated display device 10 and the sensor controller 12 and execution of various applications including a drawing application. The memory includes a main memory such as a dynamic random access memory (DRAM) and an auxiliary storage device such as a flash memory. Although not illustrated, the electronic device 1 has a communication device conforming to various communication standards (wireless fidelity (Wi-Fi) (registered trademark), Bluetooth (registered trademark), etc.), and the control unit 11 is configured to be able to communicate with other electronic devices as well (including the pen 2) though this communication device.

The sensor controller 12 is an integrated circuit (IC) having a processor 12a and a memory 12b, and is configured to perform each process to be described below by the processor 12a reading and executing a program stored in the memory 12b. The processing performed by the sensor controller 12 includes the process of deriving the position of the pen 2 on the sensor panel and acquiring the data transmitted by the pen 2 by exchange of signals between the sensor controller 12 and the pen 2 via capacitive coupling between the pen tip electrode 2a of the pen 2 and the negative electrode 21 as the sensor panel. Hereinafter, among the signals transmitted and received in this manner, a signal transmitted from the sensor controller 12 to the pen 2 is referred to as an uplink signal US, and a signal transmitted from the pen 2 to the sensor controller 12 is referred to as a downlink signal DS.

The sensor controller 12 is configured to set a plurality of time slots in a frame having a predetermined time length (display time for one screen) set by the control unit 11 so as to receive the downlink signal DS only within each time slot. Further, the sensor controller 12 is configured to transmit the uplink signal US only at the beginning of each frame. Hereinafter, these points will be described in detail with reference to FIG. 3.

Figure 3:
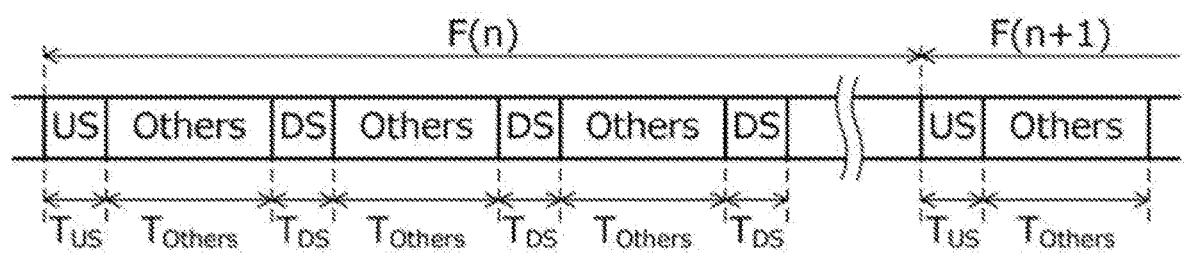
FIG. 3 is a diagram illustrating a frame structure set by a control unit and a sensor controller illustrated in FIG. 1.

FIG. 3 is a diagram illustrating a frame structure set by the control unit 11 and the sensor controller 12. The control unit 11 sets a frame F(n) having a predetermined time length and shares the frame F(n) with the sensor controller 12. The sensor controller 12 sets one or more time slots (a period of the illustrated time length Tips; specific time period) in the frame F(n) thus set by the control unit 11. The sensor controller 12 can use the negative electrode 21 only in the period of time length Tus from the start of each frame F(n) and in each time slot. During the other time (illustrated period of time length $T_{Others}$), since the ground potential is supplied from the control unit 11 to the negative electrode 21 for the display operation of the display device 10, the sensor controller 12 cannot use the negative electrode 21.

The sensor controller 12 is configured to transmit the uplink signal US by using a period of time length Tus from the start of each frame F(n). The uplink signal US transmitted in this manner plays a role to notify the pen 2 of the reference time of one frame period. As details will be described with reference to FIGS. 4 and 5, the uplink signal US includes a signal for instructions to transmit a long burst signal and a signal for instructions to transmit a data signal.

When receiving the uplink signal US via the capacitive coupling between the pen tip electrode 2a and the negative electrode 21, the pen 2 first establishes frame synchronization with the sensor controller 12. To be specific, the pen 2 acquires the start timing of the frame from the reception timing of the uplink signal US, and acquires the temporal position of each time slot in the frame at the same time. The temporal position of each time slot in the frame is shared in advance between the sensor controller 12 and the pen 2. The temporal position of each time slot in the frame may have a plurality of patterns, and in this case, by arranging information for identifying any one of the patterns in the uplink signal US, the pen 2 can obtain the temporal position of each time slot in the frame.

The pen 2 is configured to transmit the downlink signal DS in each of the one or more time slots. The downlink signal DS includes a data signal indicating a pen operation state and a burst signal that does not include a data signal. The data transmitted by the data signal includes the value of the writing pressure (pressure applied to the pen tip) detected by the pen 2, the pen ID held by the pen 2, the on/off state of a switch provided in the pen 2, or the like. Specifically, the burst signal is configured by repeating a waveform used by the sensor controller for pen detection, and more specifically, is configured by a single frequency signal (namely, a sine waveform having a predetermined frequency).

The sensor controller 12 is configured to operate in either a global scan mode for detecting the undetected pen 2 or a local scan mode for updating the position of the detected pen 2 and receiving data transmitted by the pen 2.

The sensor controller 12 in the global scan mode transmits the uplink signal US for instruction to transmit a long burst signal, at the beginning of the frame. The pen 2 that has received the uplink signal US transmits the downlink signal DS that is a burst signal in each of the slots in the frame. The sensor controller 12 receives the thus transmitted burst signal by each electrode 30 (see FIG. 2), and derives the position of the pen 2 in the touch surface 10a based on the reception level at each electrode 30.

The sensor controller 12 in the local scan mode transmits the uplink signal US for instruction to transmit a data signal, at the beginning of the frame. Upon receiving the uplink signal US, the pen 2 transmits the downlink signal DS that is a burst signal or a data signal in each of the slots in the frame. The sensor controller 12 receives a burst signal at each of a predetermined number of electrodes 30 (see FIG. 2) in the vicinity of the position of the pen 2 that has been derived immediately before, and updates the position of the pen 2. Moreover, the data transmitted by the pen 2 is acquired by receiving the data signal at one electrode 30 (see FIG. 2) that is closest to the position of the pen 2 that has been derived immediately before.

The sensor controller 12 reports the position of the pen 2 derived in the manner as described above and the acquired data to the control unit 11. The sensor controller 12 is configured to acquire pen-down information indicating that the pen 2 has touched the touch surface and pen-up information indicating that the pen 2 has left the touch surface based on the writing pressure value included in the acquired data and to report the information to the control unit 11 at each timing.

In response to input of the position of the pen 2 from the sensor controller 12, the control unit 11 performs at least one of display of a pointer and generation of ink data. Out of these, the pointer display is performed by displaying a predetermined pointer image at a position corresponding to the input coordinates on the display area of the display device 10.

The ink data is data including respective control points constituted by a plurality of positions sequentially supplied from the sensor controller 12, and curve data obtained by interpolating predetermined interpolation curves between the control points. The control unit 11 starts the generation of ink data when the pen-down information is input, and ends the generation when the pen-up information is input. Note that the control unit 11 also controls the width and/or transparency of the curve of the curve data constituting the ink data based on the writing pressure value and the like received from the pen 2. The control unit 11 renders the generated ink data to cause the display device 10 to display an image of the data, and stores the generated ink data in its own memory.

The outline of the system according to the present embodiment has been described above. Next, the specific configuration which prevents the long burst signal from becoming noise and enables the sensor controller 12 to easily detect the long burst signal while enjoying the benefits of the long burst signal described in Patent Document 1 A will be described in more detail with reference to FIGS. 4 and 5.

Figure 4:
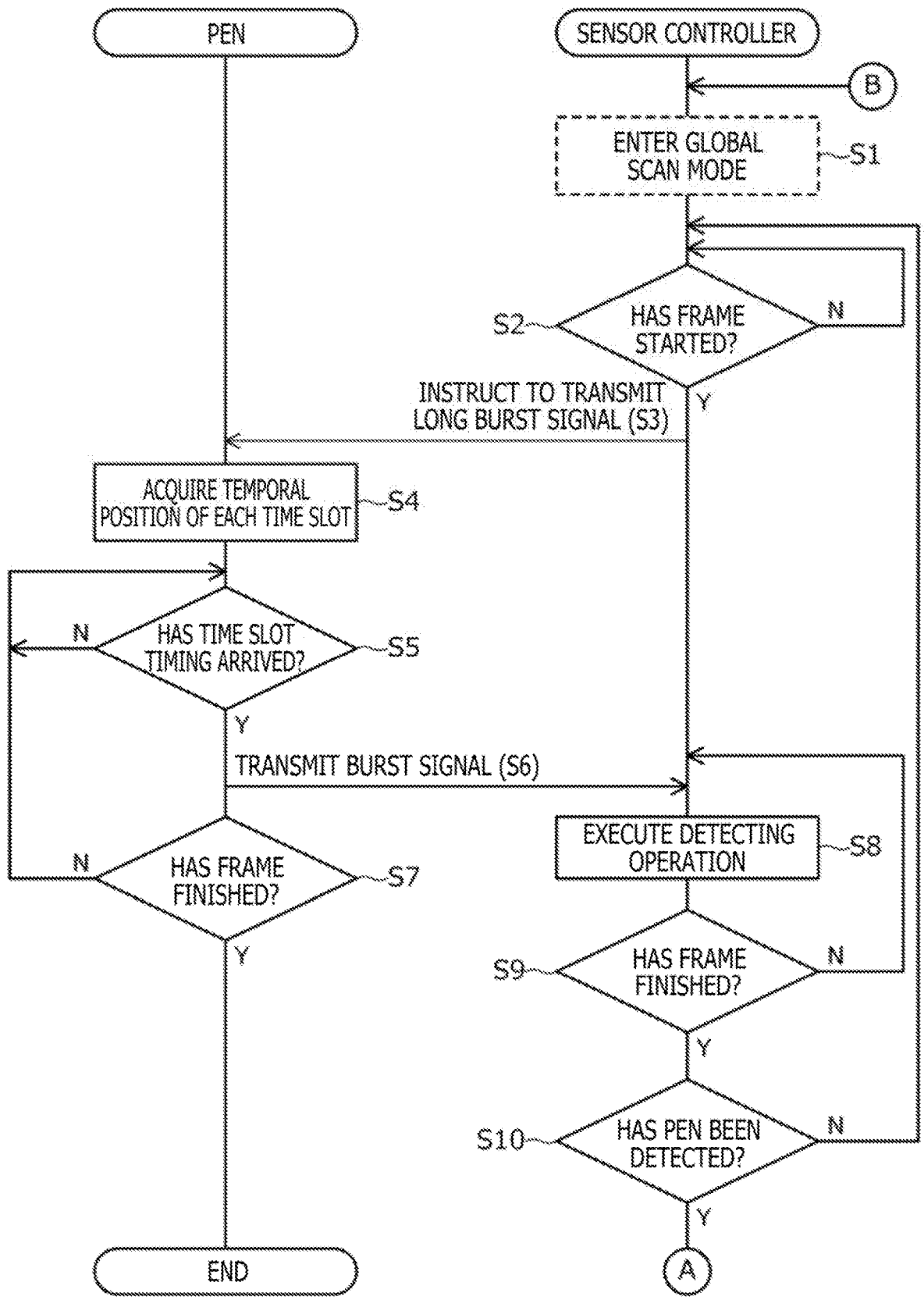
FIG. 4 is a sequence diagram illustrating operations of the sensor controller and the pen illustrated in FIG. 1.
Figure 5:
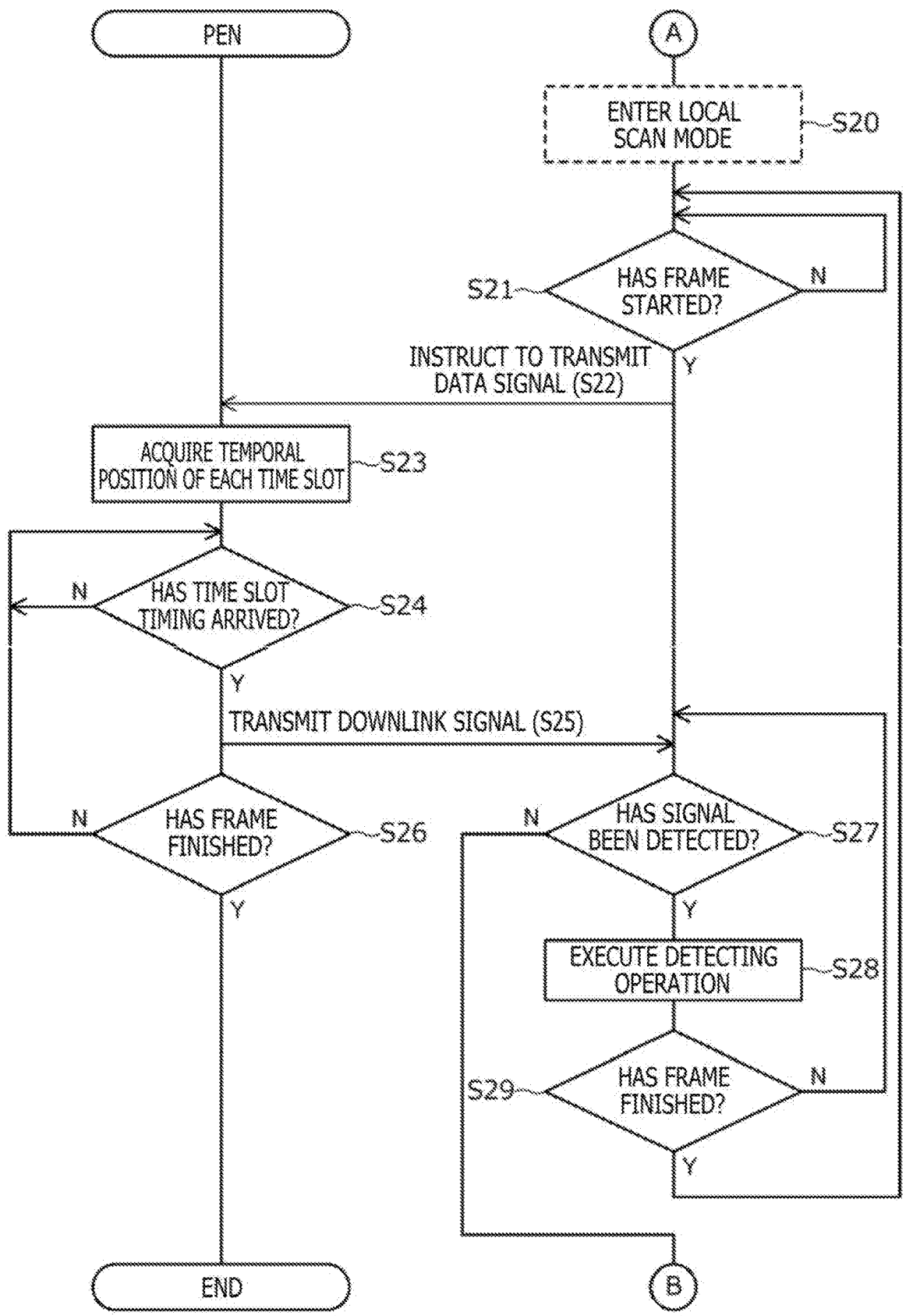
FIG. 5 is a sequence diagram illustrating operations of the sensor controller and the pen illustrated in FIG. 1.

FIGS. 4 and 5 are sequence diagrams illustrating the operations of the sensor controller 12 and the pen 2. FIG. 4 illustrates a case where the sensor controller 12 is in the global scan mode, and FIG. 5 illustrates a case where the sensor controller 12 is in the local scan mode.

Referring to FIG. 4 first, the sensor controller 12 that has entered the global scan mode (S1), at the timing when the start time of the frame arrives (S2), transmits the uplink signal US (first signal) indicating the transmission instruction of a long burst signal via the negative electrode 21 serving as a sensor panel (S3).

When receiving the uplink signal US thus transmitted, the pen 2 acquires the temporal positions of one or more time slots included in the frame indicated by the received uplink signal US (S4). Then, the pen 2 determines whether or not the start timing of the time slot has arrived (S5), and transmits a burst signal when determining that the start timing has arrived (S6). The pen 2 continues to perform the processes at S5 and S6 until one frame has finished (S7).

Here, when transmitting a burst signal at S6, the pen 2 preferably transmits a burst signal with the same initial phase in each slot. By doing so, the timing at which the sensor controller 12 starts the pen detecting operation (time slot start timing) can be made to agree with the transmission start timing of the burst signal, so that the sensor controller 12 can easily detect the burst signal.

When receiving the burst signal transmitted by the pen 2 in each time slot, the sensor controller 12 performs the detecting operation of the pen 2 based on the received burst signal (S8). This detecting operation includes processes of acquiring the reception level of the burst signal at each of the plurality of electrodes 30 illustrated in FIG. 2, acquiring the intensity distribution of the burst signal in the touch surface 10a based on each acquired reception level, and deriving the position of the pen 2 based on the result. A series of processes from acquisition of the reception level of the burst signal at each of the plurality of electrodes 30 to derivation of the position of the pen 2 may be completed within one time slot, or may be performed throughout a plurality of time slots.

The sensor controller 12 repeats the reception of the burst signal and the detecting operation at S8 until one frame has finished (S9). Then, after the frame has finished, the sensor controller 12 determines whether or not the pen 2 has been detected (S10), and returns to S2 and repeats the process in the global scan mode when determining that the pen 2 has not been detected, and on the other hand, enters the local scan mode when determining that the pen 2 has been detected, as illustrated in FIG. 5 (S20).

As illustrated in FIG. 5, the sensor controller 12 that has entered the local scan mode (S20), at the timing when the start time of the frame arrives (S21), transmits the uplink signal US (a second signal having a different content from the first signal) indicating the transmission instruction of a data signal via the negative electrode 21 as the sensor panel (S22). The uplink signal US preferably includes information (command) that specifically designates the content of data to be transmitted by the pen 2 (the above-described writing pressure value, pen ID, switch on/off state, etc.).

When receiving the uplink signal US thus transmitted, the pen 2 acquires the temporal positions of one or more time slots included in the frame indicated by the received uplink signal US (S23). Then, the pen 2 determines whether or not the start timing of the time slot has arrived (S24), and transmits the downlink signal DS when determining that the time slot has arrived (S25). The downlink signal DS transmitted here is preferably a signal including a burst signal and a data signal obtained by modulating a carrier wave with data requested by the uplink signal US. When the size of data to be transmitted is large, one data signal may be transmitted by using a plurality of slots. The pen 2 continues to perform the processing of S24 and S25 until one frame has finished (S26).

The sensor controller 12 first determines whether or not the downlink signal DS has been detected in each time slot (S27). As a result, when determining that the signal has not been detected, the sensor controller 12 determines that the pen 2 has gone out of the communicable range, and returns to the global scan mode (S1 in FIG. 4). Note that the sensor controller 12 may return to the global scan mode only when the downlink signal DS has been undetectable continuously over a plurality of time slots.

On the other hand, when having determined that the detection has been made at S27, the sensor controller 12 performs a detecting operation of the pen 2 based on the detected downlink signal DS (S28). This detecting operation includes the operation of deriving the position of the pen 2 based on the burst signal portion in the downlink signal DS and the operation of acquiring the data transmitted by the pen 2 by demodulating the data signal portion in the downlink signal DS. In the operation for deriving the position, it is preferable to acquire the intensity distribution of the burst signal based on the reception level of the burst signal not of all the electrodes 30 constituting the negative electrode 21 but of only each of a predetermined number of electrodes 30 positioned in the vicinity of the position of the pen 2 that has been derived immediately before. In the operation of acquiring data, it is preferable to demodulate the data signal received by one electrode 30 closest to the position of the pen 2 that has been derived immediately before.

The sensor controller 12 repeatedly performs the reception of the downlink signal DS and the detecting operation at S28 until one frame has finished (S29). After the end of the frame, the processing returns to S21 and the local scan mode process is continued.

As described above, according to the present embodiment, transmission of a burst signal is carried out over one frame, whereas a burst signal is transmitted only during a time period (=time slot) in which the sensor controller 12 performs a pen detecting operation, and therefore the long burst signal can be prevented from becoming noise while the benefits of the long burst signal described in Patent Document 1 are enjoyed. In addition, since the timing at which the sensor controller 12 starts the pen detecting operation (time slot start timing) can be made to agree with the transmission start timing of the burst signal, the sensor controller 12 can easily detect the long burst signal.

As mentioned above, although the preferred embodiment of the present disclosure has been described, the present disclosure is not limited to such embodiment at all, and the present disclosure can be implemented in various aspects without departing from the scope of the disclosure as a matter of course.

For example, in the above embodiment, although the example in which the negative electrode of the organic EL display is used as the sensor panel has been described, in the case of a liquid crystal display, for example, the common electrode is preferably used as the sensor panel. In addition, the negative electrodes or the common electrodes are constituted by a plurality of first linear electrodes respectively extending in an x direction (direction in the touch surface 10a) and arranged at equal intervals in a y direction (direction perpendicular to the x direction in the touch surface 10a), and in addition to the negative electrodes or the common electrodes, a plurality of second linear electrodes respectively extending in the y direction and arranged at equal intervals in the x direction are provided, so that a sensor panel may be constituted by these first and second linear electrodes.

The sensor controller 12 may be configured to detect not only the pen 2 but also a finger. In this case, during the time for which "Others" is illustrated in FIG. 3, a touch detecting operation for detecting a touch with a finger may be performed in addition to the display operation of the display device 10. By doing this, the long burst signal can be prevented from becoming noise for the touch detecting operation.

What is claimed is:

1. A method implemented in a system for deriving a position of a pen on a sensor panel by transmitting and receiving signals via capacitive coupling between a pen tip electrode of the pen and the sensor panel, the method comprising:

transmitting a first signal indicating a reference time of one frame period via the sensor panel, from a sensor controller that performs a pen detecting operation only at one or more specific time periods in the one frame period; and transmitting a burst signal that does not include a data signal indicating an operating state of the pen, from the pen that has detected the first signal, at each of the one or more specific time periods in the frame period indicated by the first signal, wherein the burst signal is constituted by a waveform that is repeated and used by the sensor controller for pen detection, wherein the burst signal is a single frequency signal, and wherein, during each specific time period of the one or more specific time periods in the frame period indicated by the first signal, the burst signal is transmitted for a time length of the specific time period.

2. The method according to claim 1, wherein the one frame period includes two or more of the specific time periods.

3. The method according to claim 2, wherein the pen transmits the burst signal at a same initial phase at each of the two or more of the specific time periods.

4. The method according to claim 1, further comprising:
indicating the reference time of the one frame period and transmitting a second signal having a different content from the first signal from the sensor controller when the sensor controller detects the burst signal; and
transmitting the data signal from the pen that has detected the second signal, at each of the one or more specific time periods in the frame period indicated by the second signal.

5. A pen that transmits and receives signals to and from a sensor controller that performs a pen detecting operation only at one or more specific time periods in one frame period, through capacitive coupling between a pen tip electrode and a sensor panel, the pen including:
a processor; and
a memory storing instructions that, when executed by the processor, cause the pen to:
receive a first signal indicating a reference time of the one frame period from the sensor controller; and
transmit a burst signal that does not include a data signal at each of the one or more specific time periods in the frame period indicated by the first signal,
wherein the burst signal is constituted by a waveform that is repeated and used by the sensor controller for pen detection,
wherein the burst signal is a single frequency signal, and wherein, during each specific time period of the one or more specific time periods in the frame period indicated by the first signal, the burst signal is transmitted for a time length of the specific time period.

6. A sensor controller for deriving a position of a pen on a sensor panel by transmitting and receiving signals via capacitive coupling between a pen tip electrode of the pen and the sensor panel, the sensor controller comprising:
a processor; and
a memory storing instructions that, when executed by the processor, cause the sensor controller to:
perform a pen detecting operation only at one or more specific time periods in one frame period;
transmit a first signal indicating a reference time of the one frame period via the sensor panel; and
derive the position of the pen based on a burst signal that does not include a data signal and that is transmitted from the pen that has detected the first signal, at each of the one or more specific time periods in the frame period indicated by the first signal,
wherein the burst signal is constituted by a waveform that is repeated and used by the sensor controller for pen detection,
wherein the burst signal is a single frequency signal, and wherein, during each specific time period of the one or more specific time periods in the frame period indicated by the first signal, the burst signal is transmitted for a time length of the specific time period.

* * * * *